United States Patent
Xiao et al.

(10) Patent No.: US 11,735,725 B2
(45) Date of Patent: Aug. 22, 2023

(54) CERAMIC COATING FOR LITHIUM OR SODIUM METAL ELECTRODES

(71) Applicant: GM GLOBAL TECHNOLOGY OPERATIONS LLC, Detroit, MI (US)

(72) Inventors: Xingcheng Xiao, Troy, MI (US); Jin Liu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 386 days.

(21) Appl. No.: 16/698,361

(22) Filed: Nov. 27, 2019

(65) Prior Publication Data

US 2021/0159493 A1 May 27, 2021

(51) Int. Cl.
| | | |
|---|---|---|
| H01M 4/40 | (2006.01) | |
| H01M 4/134 | (2010.01) | |
| H01M 4/04 | (2006.01) | |
| H01M 4/1395 | (2010.01) | |
| H01M 10/0525 | (2010.01) | |
| H01M 4/02 | (2006.01) | |

(52) U.S. Cl.
CPC ......... *H01M 4/405* (2013.01); *H01M 4/0409* (2013.01); *H01M 4/134* (2013.01); *H01M 4/1395* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | |
|---|---|---|
| 8,496,855 B2 | 7/2013 | Choi |
| 8,974,946 B2 | 3/2015 | Cai et al. |
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,318,738 B2 | 4/2016 | Kim et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,537,144 B2 | 1/2017 | Huang et al. |

(Continued)

FOREIGN PATENT DOCUMENTS

| | | |
|---|---|---|
| CN | 112864361 A | 5/2021 |
| DE | 102020127849 A1 | 5/2021 |
| JP | 2010129430 A * | 6/2010 |

OTHER PUBLICATIONS

English Language Machine Translation of JP-2010129430-A retrieved from Espacenet (Year: 2010).*

(Continued)

*Primary Examiner* — Alix E Eggerding
(74) *Attorney, Agent, or Firm* — Harness, Dickey & Pierce, P.L.C.

(57) ABSTRACT

An electrode including an electrode active material and a mesoporous film coating at least a portion of the electrode active material is provided. The mesoporous film coats at least a portion of the electrode active material and includes $M_2SiO_3$, $MAlO_2$, $M_2O$—$Al_2O_3$—$SiO_2$, or combinations thereof, where M is lithium (Li), sodium (Na), or a combination thereof. Methods of fabricating the electrode are also provided.

20 Claims, 7 Drawing Sheets

(56) References Cited

U.S. PATENT DOCUMENTS

| | | |
|---|---|---|
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 2002/0122986 A1* | 9/2002 | Labarge ............ H01M 10/0525 29/623.2 |
| 2007/0190415 A1 | 8/2007 | Sung et al. |
| 2010/0167124 A1* | 7/2010 | Seo .................. H01M 50/46 429/212 |
| 2013/0115513 A1 | 5/2013 | Choi et al. |
| 2015/0017535 A1 | 1/2015 | Hong et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0228975 A1 | 8/2015 | Lee et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2017/0162859 A1 | 6/2017 | Yang et al. |
| 2017/0214079 A1 | 7/2017 | Dai et al. |
| 2017/0271678 A1 | 9/2017 | Yang et al. |
| 2018/0254531 A1* | 9/2018 | Xiao .................... H01M 50/423 |
| 2018/0294517 A1 | 10/2018 | Yersak et al. |
| 2018/0309165 A1 | 10/2018 | Yersak et al. |
| 2018/0309166 A1 | 10/2018 | Yersak et al. |
| 2018/0375148 A1 | 12/2018 | Yersak et al. |
| 2019/0372155 A1 | 12/2019 | Yersak et al. |
| 2019/0393549 A1 | 12/2019 | Yersak et al. |
| 2020/0127282 A1 | 4/2020 | Yersak et al. |
| 2020/0203694 A1* | 6/2020 | Yun .................... H01M 50/409 |
| 2020/0395630 A1 | 12/2020 | Yersak et al. |
| 2021/0083249 A1 | 3/2021 | Xiao et al. |
| 2021/0083294 A1* | 3/2021 | Xiao .................... H01M 4/137 |

OTHER PUBLICATIONS

Yersak, Thomas A. et al., U.S. Appl. No. 15/992,878, filed May 30, 2018 entitled, "Methods of Manufacturing High-Active-Material-Loading Composite Electrodes and All-Solid-State Batteries Including Composite Electrodes," 55 pages.

Yersak, Thomas A. et al., U.S. Appl. No. 16/164,525, filed Oct. 18, 2018 entitled, "Low-Expansion Composite Electrodes for All-Solid-State Batteries," 53 pages.

Yersak, Thomas A. et al., U.S. Appl. No. 16/560,270, filed Sep. 4, 2019 entitled, "Sulfide and Oxy-Sulfide Glass and Glass-Ceramic Films for Batteries Incorporating Metallic Anodes," 31 pages.

Xiao, Xingcheng et al., U.S. Appl. No. 16/575,143, filed Sep. 18, 2019 entitled, "Additive To Ceramic Ion Conducting Material To Mitigate the Resistive Effect of Surface Carbonates and Hydroxides," 51 pages.

Xu, Jiagang et al., U.S. Appl. No. 16/668,904, filed Oct. 30, 2019 entitled, "Liquid Metal Interfacial Layers for Solid Electrolytes and Methods Thereof," 44 pages.

* cited by examiner

CERAMIC COATING FOR LITHIUM OR SODIUM METAL ELECTRODES

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. In electrochemical cells, such as in lithium-metal batteries, one of the two electrodes serves as a positive electrode or cathode, and the other electrode, composed of a metal, serves as a negative electrode or anode. Conventional rechargeable lithium-metal batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions (or sodium ions in the case of sodium metal batteries) between the electrodes and, like the two electrodes, may be in a solid form, a liquid form, or a solid-liquid hybrid form. In the instances of solid-state batteries, which include a solid-state electrolyte disposed between solid-state electrodes, the solid-state electrolyte physically separates the electrodes so that a distinct separator is not required.

Lithium-metal batteries often include a cathode having an active material including transition metals (e.g., $LiMnO_2$), a lithium-metal anode, a separator disposed between the cathode and the anode, and a liquid electrolyte disposed between the cathode and the anode, including within the separator. An exemplary liquid electrolyte is $LiPF_6$ in a carbonate-based organic solvent. During cycling, decomposition products of the liquid electrolyte form a passivation layer referred to as a solid electrolyte interphase (SEI) on a surface of the anode. Some SEIs promote proper lithium ion transport to the anode surface. However, volume changes in the anode that occur during cycling may cause gaps to form in the SEI that expose the lithium-metal surface. As lithium ions migrate to the metal surface, the SEI becomes mossy, its surface area increases, and dendrites may form. This mossy SEI increases the impedance of the battery and decreases cycle efficiency and cycle life. Further, the dendrites can grow to contact the cathode and create a short.

Moreover, especially at elevated temperatures of from about 40° C. to about 60° C., water in the electrolyte may react with the $LiPF_6$ to generate HF, LiF, and $H_3PO_4$. The HF can react with the cathode active material, causing the release of transition metal ions (e.g., $Mn^{2+}$). This phenomenon of transition metal ion release is known as transition metal dissolution. As a result of transition metal dissolution, the transition metal ions can precipitate back onto the cathode or migrate to and become deposited on the anode, resulting in cathode active material loss, fading capacity, damage to a solid electrolyte interphase layer, and/or blocking of lithium ion intercalation into the negative electrode.

In attempts to prevent transition metal dissolution, separators have been coated with the ceramic materials $SiO_2$ and $Al_2O_3$ for the purpose of scavenging HF. The $SiO_2$ and $Al_2O_3$ react with the HF to generate the hydrates $SiF_4 \cdot XH_2O$ and $AlF_3 \cdot XH_2O$, respectively. However, at elevated temperatures, the water molecules release from the hydrates, promoting further hydrolysis of $LiPF_6$. Accordingly, protective coatings for metal anodes that prevent or minimize the formation of mossy SEIs and dendrites and that minimize, inhibit, or prevent impedance increases during cycling are desired.

SUMMARY

This section provides a general summary of the disclosure, and is not a comprehensive disclosure of its full scope or all of its features.

In various aspects, the current technology provides an electrode including an electrode active material and a mesoporous film coating at least a portion of the electrode active material, wherein the mesoporous film includes $M_2SiO_3$, $MAlO_2$, $M_2O-Al_2O_3-SiO_2$, or combinations thereof, where M is lithium (Li), sodium (Na), or a combination thereof.

In one aspect, the mesoporous film includes $Li_2SiO_3$, $LiAlO_2$, $Li_2O-Al_2O_3-SiO_2$, or combinations thereof.

In one aspect, the mesoporous film includes $Na_2SiO_3$, $NaAlO_2$, $Na_2O-Al_2O_3-SiO_2$, or combinations thereof.

In one aspect, the mesoporous film includes a plurality of pores, wherein the plurality of pores have an average pore size of greater than or equal to about 0.2 nm to less than or equal to about 10 nm.

In one aspect, the mesoporous film has a porosity of greater than or equal to about 15% to less than or equal to about 50%.

In one aspect, the mesoporous film has a surface area of greater than or equal to about 20 $m^2/g$ to less than or equal to about 1500 $m^2/g$.

In one aspect, the mesoporous film is disposed on the electrode active material as a continuous film that coats at least a portion of the electrode active material.

In one aspect, the mesoporous film has a thickness of greater than or equal to about 1 μm to less than or equal to about 50 μm.

In one aspect, the electrode is an anode, and the electrode active material is lithium (Li) metal or sodium (Na) metal.

In one aspect, the electrode is located in a battery that cycles lithium (Li) or sodium (Na) ions.

In various aspects, the current technology also provides an electrode including an anode active material including lithium (Li) or sodium (Na) and a mesoporous film including $M_2SiO_3$, $MAlO_2$, $M_2O-Al_2O_3-SiO_2$, or combinations thereof, where M is lithium (Li), sodium (Na), or combinations thereof, the mesoporous film coating at least a portion of the anode active material, wherein the mesoporous film includes a plurality of pores having an average pore size of greater than or equal to about 0.2 nm to less than or equal to about 10 nm, a porosity of greater than or equal to about 15% to less than or equal to about 50%, and a surface area of greater than or equal to about 20 $m^2/g$ to less than or equal to about 1500 $m^2/g$.

In one aspect, the anode active material includes lithium (Li) metal, and the mesoporous film comprises $Li_2SiO_3$, $LiAlO_2$, $Li_2O-Al_2O_3-SiO_2$, or combinations thereof.

In one aspect, the anode active material includes sodium (Na) metal, and the mesoporous film includes $Na_2SiO_3$, $NaAlO_2$, $Na_2O-Al_2O_3-SiO_2$, or combinations thereof.

In one aspect, the electrode is an anode positioned within an electrochemical cell.

In one aspect, a battery that conducts lithium (Li) ions or sodium (Na) ions includes the electrode as an anode, a cathode, and a liquid or solid electrolyte disposed between the anode and the cathode.

In various aspects, the current technology further provides a method of fabricating an electrode, the method including mixing a powder into a binder solution including a binder dissolved in a solvent to form a slurry having a viscosity of greater than or equal to about 1 cps to less than or equal to about 10,000 cps, the powder including particles of $M_2SiO_3$, $MAlO_2$, $M_2O$—$Al_2O_3$—$SiO_2$, or combinations thereof, where M is lithium (Li), sodium (Na), or a combination thereof having a particle porosity of greater than or equal to about 5% to less than or equal to about 50% and a particle surface area of greater than or equal to about 80 $m^2/g$ to less than or equal to about 500 $m^2/g$; under an inert atmosphere, casting a layer of the slurry onto a surface of an anode including lithium (Li) metal or sodium (Na) metal; and removing the solvent from the slurry to form a mesoporous film on the anode, wherein the mesoporous film has a first porosity.

In one aspect, the casting is performed by spin casting.

In one aspect, the layer of the slurry has a thickness of greater than or equal to about 1 μm to less than or equal to about 50 μm.

In one aspect, the slurry includes the powder at a concentration of greater than or equal to about 20 wt. % to less than or equal to about 70 wt. %.

In one aspect, the method further includes calendaring the coated electrode to generate a second porosity in the coating, the second porosity being lower than the first porosity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
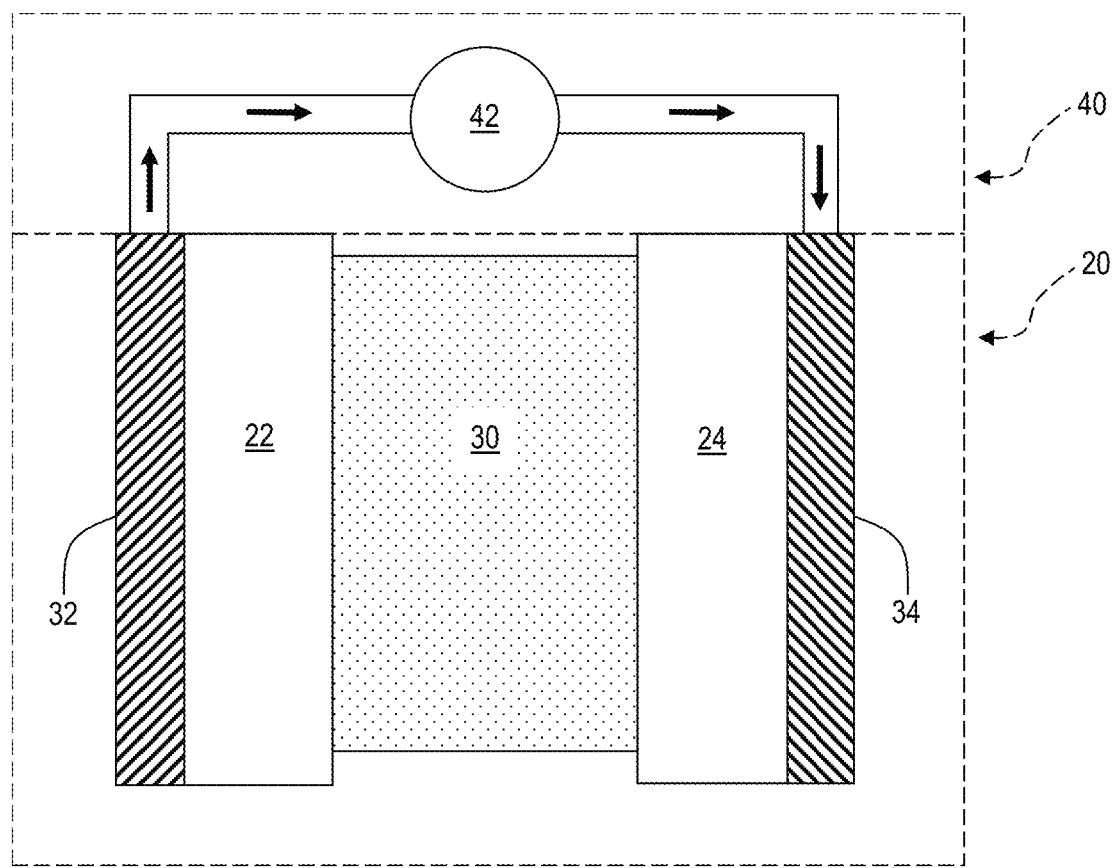
FIG. 1 is an illustration of an electrochemical cell in accordance with various aspects of the current technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology provides a mesoporous film that is suitable for coating the surface of a metal, e.g., lithium or sodium, electrode. The mesoporous film protects the metal electrode, regulates current distribution, and suppresses (minimizes, inhibits, or prevents) mossy solid electrolyte interphase (SEI) and dendrite formations. The mesoporous film comprises ceramic metal oxides, e.g., lithium oxide or sodium oxide, which retain electrolyte molecules close to the metal surface, making charge transfer more uniform relative to an equivalent electrode that does not have the mesoporous coating. The mesoporous coating also blocks electrons, thus further suppressing electrolyte decomposition. In addition, the mesoporous film is a hydrofluoric acid (HF) scavenger that traps protons, for example, from HF, without forming hydrates that can be released at elevated temperatures. As a result, impedance and electrode lifetime are improved relative to electrodes that do not comprise the mesoporous film.

A schematic illustration of an exemplary electrochemical cell 20 (also referred to as the battery, which comprises at least one electrochemical cell) that cycles lithium ions is shown in FIG. 1. Unless specifically indicated otherwise, the term "ions" as used herein refers to lithium ions or sodium ions. For example, an electrochemical cell 20 that cycles sodium ions has similar components as the lithium-metal battery 20, but replaces the lithium and lithium ions with sodium and sodium ions in corresponding components. The battery 20 includes a negative electrode (i.e., an anode) 22, a positive electrode (i.e., a cathode) 24, and a separator 30 (e.g., a microporous polymeric separator) disposed between the two electrodes 22, 24. An electrolyte is present throughout the separator 30 and, optionally, in positive electrode 24. A negative electrode current collector 32 may be positioned at or near the negative electrode 22, and a positive electrode current collector 34 may be positioned at or near the positive electrode 24. While not shown, the negative electrode current collector 32 and the positive electrode current collector 34 may be coated on one or both sides with a negative electrode active material or a positive electrode active material, respectively, as is known in the art. Therefore, in certain aspects, the current collectors 32, 34 may be coated with an electrode active material/electrode layer on both sides. The negative electrode current collector 32 and positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). Composite electrodes can also include a binder, such as polyvinylidene fluoride (PVDF), and/or an electrically conductive carbon, such as carbon black or carbon nanotubes, which are dispersed throughout materials that define the negative electrode 22 and/or the positive electrode 24.

The battery 20 can generate an electric current (indicated by the block arrows) during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte solution contained in the separator 30 towards the positive electrode 24. The electrons flow through the external circuit 40 and the lithium ions migrate across the separator 30 containing the electrolyte solution to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-energized at any time by connecting an external power source to the battery 20 to reverse the electrochemical reactions that occur during battery discharge. The connection of an external electrical energy source to the battery 20 compels the otherwise non-spontaneous oxidation of intercalated lithium at the positive electrode 24 to produce electrons and ions. The electrons, which flow back towards the negative electrode 22 through the external circuit 40, and the ions, which are carried by the electrolyte solution across the separator 30 back towards the negative electrode 22, reunite at the negative electrode 22 and replenish it with lithium for use during the next battery discharge event. As such, each complete discharging event followed by a complete charging event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators, and AC-DC converters connected to an AC electrical power grid through a wall outlet and a motor vehicle alternator.

In many metal battery configurations, each of the negative electrode current collector 32, the negative electrode 22, the separator 30, the positive electrode 24, and the positive electrode current collector 34 are prepared as relatively thin layers (for example, from several microns to a fraction of a millimeter or less in thickness) and assembled in layers connected in electrical parallel arrangement to provide a suitable electrical energy and power package. In various other instances, the battery 20 may include electrodes 22, 24 that are connected in series. Further, the separator 30 operates as an electrical insulator by being sandwiched between the negative electrode 22 and the positive electrode 24 to prevent physical contact and thus the occurrence of a short circuit. In addition to providing a physical barrier between the electrodes 22, 24, the separator 30 acts like a sponge that contains the electrolyte solution in a network of open pores during the cycling of lithium ions to facilitate functioning of the battery 20.

The battery 20 can include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 30. As noted above, the size and shape of the battery 20 may vary depending on the particular application for which it is designed. Battery-powered vehicles and hand-held consumer electronic devices, for instance, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to the load device 42 that is part of the external circuit 40. The load device 42 may be powered by the electric current passing through the external circuit 40 when the battery 20 is discharging. While the electrical load device 42 may be any number of known electrically powered devices, a few examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

Any appropriate electrolyte, whether in solid form (such as in a solid-state electrochemical cell) or solution, capable of conducting lithium ions between the negative electrode 22 and the positive electrode 24 may be used in the lithium-ion battery 20. In certain aspects, the electrolyte solution may be a nonaqueous liquid electrolyte solution that includes a lithium salt dissolved in an organic solvent or a mixture of organic solvents. Numerous conventional non-aqueous liquid electrolyte solutions may be employed in the lithium-ion battery 20. A non-limiting list of lithium salts that may be dissolved in an organic solvent to form the nonaqueous liquid electrolyte solution includes $LiPF_6$, $LiFSi$, $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $Li(CF_3SO_2)_2N$, and combinations thereof. These and other similar lithium salts may be dissolved in a variety of organic solvents, including, but not limited to, various alkyl carbonates, such as cyclic carbonates (ethylene carbonate (EC), propylene carbonate (PC), butylene carbonate(BC)), acyclic carbonates (dimethyl carbonate (DMC), diethyl carbonate (DEC), ethyl methyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof. However, as discussed above, some lithium salts react with water, i.e., undergo hydrolysis, which results in the formation of HF. Such lithium salts include $LiPF_6$, $LiFSi$, $LiBF_4$, $LiAsF_6$, $LiCF_3SO_3$, $LiN(CF_3SO_2)_2$, $Li(CF_3SO_2)_2N$, and combinations thereof. Therefore, ceramic HF scavengers are included in or on negative or positive electrodes 22, 24, as discussed further below.

The separator 30 operates as both an electrical insulator and a mechanical support. In one embodiment, a microporous polymeric separator 30 comprises a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, multiple discrete layers of similar or dissimilar polyolefins may be assembled to form the microporous polymer separator 30. The polyolefins may be homopolymers (derived from a single monomer constituent) or heteropolymers (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of PE and PP, or multi-layered structured porous films of PE and/or PP. The microporous polymer separator 30 may also comprise other polymers in addition to the polyolefin, such as, but not limited to, polyethylene terephthalate (PET), polyvinylidene fluoride (PVDF), and/or a polyamide. Furthermore, the microporous polymer separator 30 may be mixed with a ceramic material or its surface may be coated in a ceramic material. For example, a ceramic coating may include alumina ($Al_2O_3$), silicon dioxide ($SiO_2$), titania ($TiO_2$), or combinations thereof. Commercially available polyolefin porous membranes include CELGARD® 2500 (a monolayer polypropylene separator) and CELGARD® 2320 (a trilayer polypropylene/polyethylene/polypropylene separator), both available from Celgard, LLC. The polyolefin layer and any other optional polymer layers may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such microporous polymer separators 30.

The positive electrode 24 may be formed from a lithium-based or sodium-based active material that can sufficiently undergo lithium/sodium intercalation and deintercalation or alloying and dealloying, while functioning as the positive terminal of the battery 20. In various aspects, the positive electrode 24 includes a positive electrode active material in spinel or layered-oxide phases, the positive electrode active material comprising lithium/sodium transition metal oxides or lithium/sodium transition metal polyanions. Non-limiting examples of transition metal oxides include lithium cobalt oxide (LCO, $LiCoO_2$); lithium manganese oxide (LMO, $LiMn_2O_4$); $Li_{1+x}M_{2-x}O_2$, where $0 \leq x \leq 1$ and M is a transition metal (e.g., Fe, Ni, Mn, Co, Ti, V, and combinations thereof); lithium nickel cobalt manganese oxide (NMC/NCM, LiNiCoMnO$_2$), including $LiNi_xMn_yCo_{1-x-y}O_2$, where $0 \leq x \leq 1$ and $0 \leq y \leq 1$; lithium nickel cobalt aluminum oxide (NCA, LiNiCoAlO$_2$); lithium nickel manganese spinel (LNMO, $LiNi_{0.5}Mn_{1.5}O_4$); and $LiNi_xMn_{1-x}O_2$, where $0 \leq x \leq 1$. Non-limiting examples of transition metal polyanions include phosphates, such as $LiMPO_4$, where M is Fe, Mn, Co, Ni, Zn, V, or combinations thereof, $LiV_2(PO_4)_3$, and $Li_3Fe_3(PO_4)_4$; fluorophosphates, such as $Li_2MPO_4F$, where M is Fe, Mn, Co, Ni, Zn, V, or combinations thereof, $Li_2FePO_4F$, and $Li_3V_2(PO_4)F_3$; pyrophosphates, such as $Li_2MP_2O_7$, where M is Fe, Mn, Co, Ni, Zn, V, or combinations thereof; silicates, such as $Li_2MSiO_4$, where M is Fe, Mn, Co, Ni, Zn, V, or combinations thereof; carbonophosphates, such as $Li_3MCO_3PO_4$ where M is Fe, Mn, Co, Ni, Zn, V, or combinations thereof; sulfates, such as $Li_2M(SO_4)_2$, where M is Fe, Mn, Co, Ni, Zn, V, or combinations thereof; and borates, such as $LiMBO_3$, where M is Fe, Mn, Co, Ni, Zn, V, or combinations thereof. The lithium of the previous examples can be exchanged with sodium for sodium-ion batteries. In certain aspects, the positive solid-state electrode active particles may be coated (for example, by $Al_2O_3$) and/or the positive electrode active material may be doped (for example, by magnesium (Mg)).

The positive electrode active materials may be powder compositions. The positive electrode active materials may be intermingled with an optional electrically-conductive material (e.g., electrically-conductive particles) and a polymeric binder. The binder may both hold together the positive electrode active material and provide ionic conductivity to the positive electrode 24. The polymeric binder may include polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, or combinations thereof.

The positive electrode active material loading in the binder can be large, such as greater than about 80 wt. %. For example, the binder can be present at a level of greater than or equal to about 1 wt. % to less than or equal to about 20 wt. %, optionally greater than or equal to about 1 wt. % to less than or equal to about 10 wt. %, optionally greater than or equal to about 1 wt. % to less than or equal to about 8 wt. %, optionally greater than or equal to about 1 wt. % to less than or equal to about 7 wt. %, optionally greater than or equal to about 1 wt. % to less than or equal to about 6 wt. %, optionally greater than or equal to about 1 wt. % to less than or equal to about 5 wt. %, or optionally greater than or equal to about 1 wt. % to less than or equal to about 3 wt. %.

Electrically conductive materials may include graphite, other carbon-based materials, conductive metals, or conductive polymer particles. Carbon-based materials may include, by way of non-limiting example, particles of KETCHEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

In certain variations, the positive electrode 24 includes the electrically-conductive material in an amount less than or equal to about 15 wt. %, optionally less than or equal to about 10 wt. %, or optionally greater than or equal to about 0.5 wt. % to less than or equal to about 8 wt. %. While the supplemental electrically conductive materials may be described as powders, these materials lose their powder-like character following incorporation into the electrode, where the associated particles of the supplemental electrically conductive materials become a component of the resulting electrode structure.

The negative electrode 22 may be formed from a host material comprising lithium, sodium, or a combination thereof that is capable of functioning as a negative terminal of a lithium-ion battery. The negative electrode 22 may thus include the electrode active material and, optionally, another electrically conductive material, as well as one or more polymeric binder materials to structurally hold the host material together. In certain variations, the negative electrode active material may comprise, consist essentially of, or consist of lithium or sodium, such as, for example, lithium metal, sodium metal, or a combination thereof. When the negative electrode active material consists essentially of lithium metal and/or sodium metal, the negative electrode material includes the lithium metal and/or sodium metal, such as in the form of a sheet of lithium metal or sodium metal, and unavoidable impurities. In certain variations, the negative electrode 22 is a film or layer formed of lithium metal, sodium metal, an alloy of lithium, or an alloy of sodium. In certain other variations, the negative electrode active material comprises carbon-based materials, such as graphite or silicon and/or silicon-based alloys. The negative electrode current collector 32 may be formed from copper (Cu) or any other appropriate electrically conductive material known to those of skill in the art.

As discussed above, some liquid electrolytes are capable of reacting with water to form HF, especially at elevated temperatures. With cooling systems in place, the battery 20 typically operates within a normal temperature that is less than or equal to about 40° C., such as within a range of greater than or equal to about 25° C. to less than about 40° C. As used herein, "elevated temperatures" are temperatures that are greater than or equal to about 40° C., such as within a range of greater than or equal to about 40° C. to less than or equal to about 60° C. Such liquid electrolytes that hydrolyze to form HF at elevated temperatures include $LiPF_6$, LiFSi, $LiBF_4$, $LiAsF_6$, $LiCF_3SO_3$, $LiN(CF_3SO_2)_2$, $Li(CF_3SO_2)_2N$, sodium derivatives thereof, and combinations thereof, as non-limiting examples. As discussed above, the HF can react with positive electrode active materials comprising at least one transition metal and cause transition metal dissolution. Although ceramic materials such as $SiO_2$ and $Al_2O_3$ have been used to scavenge HF and form the hydrates $SiF_4$—$XH_2O$ and $AlF_3.XH_2O$, respectively, at elevated temperatures, water molecules release from the hydrates, which can result in the formation of additional HF and cause transition metal dissolution. Accordingly, the current technology provides an electrode comprising an electrode active material and a mesoporous film, wherein the mesoporous film comprises $M_2SiO_3$, $MAlO_2$, $M_2O$—$Al_2O_3.SiO_2$, or combinations thereof, where M is Li, Na, or a combination thereof. Therefore, for batteries that cycle lithium ions, the mesoporous film comprises $Li_2SiO_3$, $LiAlO_2$, $Li_2O$—$Al_2O_3$—$SiO_2$, or combinations thereof, and for batteries that cycle sodium ions, the mesoporous film comprises $Na_2SiO_3$, $NaAlO_2$, $Na_2O$—$Al_2O_3$—$SiO_2$, or combinations thereof. The mesoporous film traps protons, for example, from HF, without forming hydrates that can be released at elevated temperatures. More particularly, for example, $Li_2SiO_3$ reacts with HF to form $LiHAl_2O_4$, which does not include a releasable water molecule. Similarly, $LiAlO_2$ reacts with HF to form $Li_xH_{4-x}SiO4$ ($0 \leq x \leq 4$), which does not include a releasable water molecule, and $Li_2O$—$Al_2O_3$—$SiO_2$, reacts with HF to form $Li_xH_{7-x}SiAlO_7$ ($0 \leq x < 7$), which does not include a releasable water molecule. The mesoporous film is provided as an electrode coating for a negative electrode, i.e., an anode, and in some variations, for a positive electrode.

The mesoporous film is prepared from ceramic oxide particles comprising the $M_2SiO_3$, $MAlO_2$, $M_2O$—$Al_2O_3$—$SiO_2$, or combinations thereof, having a porosity of greater than or equal to about 5% to less than or equal to about 50%, including porosities of about 5%, about 10%, about 15%, about 20%, about 25%, about 30%, about 35%, about 40%, about 45%, and about 50%, and a surface area of greater than or equal to about 80 $m^2/g$ to less than or equal to about 500 $m^2/g$, or greater than or equal to about 100 $m^2/g$ to less than or equal to about 400 $m^2/g$, including surface areas of about 80 $m^2/g$, about 100 $m^2/g$, about 125 $m^2/g$, about 150 $m^2/g$, about 175 $m^2/g$, about 200 $m^2/g$, about 225 $m^2/g$, about 250 $m^2/g$, about 275 $m^2/g$, about 300 $m^2/g$, about 325 $m^2/g$, about 350 $m^2/g$, about 375 $m^2/g$, about 400 $m^2/g$, about 425 $m^2/g$, about 450 $m^2/g$, about 475 $m^2/g$, or about 500 $m^2/g$. Methods of forming the ceramic oxide particles are described in U.S. patent application Ser. No. 16/445,610, filed on Jun. 19, 2019, which is incorporated herein by reference in its entirety. The methods include admixing a precursor zeolite-based powder with a solution, for example, an aqueous solution, comprising one or more of lithium hydroxide (LiOH) and lithium chloride (LiCl) to form a second, zeolite slurry. A weight ratio of the precursor zeolite to the solution may be greater than or equal to about 1 wt. % to less than or equal to about 10 wt. %, and a weight ratio of the lithium hydroxide to the solution may be greater than or equal to about 0.5 wt. % to less than or equal to about 5 wt. %. The precursor zeolite-based powder may include one or more zeolite materials selected from the group consisting of zeolite A, zeolite X, zeolite Y, zeolite L, ZSM-5, zeolite beta, mordenite, ferrierite, and combinations thereof. For example, the precursor zeolite may comprise a zeolite material such as zeolite Y. Zeolite Y has a ratio of silicon to aluminum of greater than or equal to about 1.5 to less than or equal to about 3 and a surface area of about 453 $m^2/g$. In various aspects, the zeolite material may have an average particle size that is less than or equal to about 5 μm, and in certain variations, optionally less than or equal to about 1 μm. In certain variations, the precursor zeolite powder further comprises greater than or equal to about 1 wt. % to less than or equal to about 20 wt. % of sodium oxide ($NaO_2$). When the mixture is exposed to a temperature greater than or equal to about 30° C. to less than or equal to about 100° C., and in certain aspects, optionally about 60° C., for a time greater than or equal to about 6 hours to less than or equal to about 24 hours, and in certain aspects, optionally about 12 hours, the sodium oxide facilitates lithium ion exchange between the lithium hydroxide and/or lithium chloride within the solution and the extra-framework cations and/or free ions within the zeolite material. In various instances, it is desirable that the zeolite material has a cumulative total concentration of sodium and hydrogen that is less than the lithium hydroxide concentration and/or lithium chloride concentration in the solution, so as to drive the ion exchange between the lithium ions and the sodium ions or protons. Such lithium ion exchange results in the formation of one or more lithiated oxides, for example, a powder comprising one or more lithiated oxides. In certain variations, the lithiated oxides, such as $Li_2SiO_3$ and $LiAlO_2$, result from such lithium ion exchange between the zeolite material and the lithium hydroxide and/or lithium chloride. In various aspects, the formed lithiated-oxide powder may be washed, for example, to remove residual lithium hydroxide and/or lithium chloride. Residual lithium hydroxide and/or lithium chloride may undesirably increase the moisture levels by reacting with carbon dioxide within the cell. The lithiated oxides may be washed using an aqueous liquid, such as water, for example. In certain variations the water may be, for example, distilled water, and in certain aspects, optionally deionized water. In various aspects, the lithiated-oxide powder may also be calcined at a temperature greater than or equal to about 200° C. to less than or equal to about 400° C., and in certain aspects, optionally about 400° C., for a time greater than or equal to about 2 hours to less than or equal to about 6 hours, and in certain aspects, optionally about 2 hours, to remove any adsorbed water.

Figure 2:
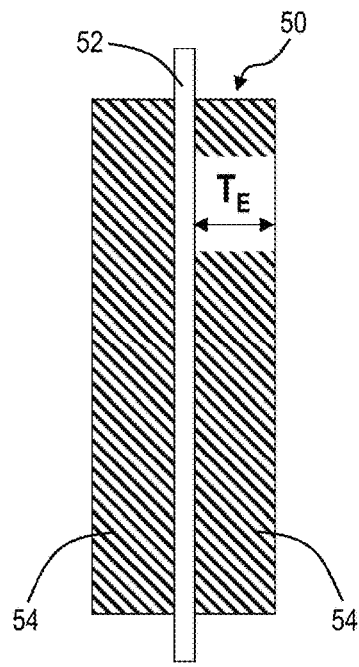
FIG. 2 is an illustration of an electrode that does not include a mesoporous film.

FIG. 2 shows an exemplary electrode 50 comprising a current collector 52 and an electrode active material 54 disposed on opposing sides of the current collector 52. The electrode active material has a thickness $T_E$ of greater than or equal to about 1 µm to less than or equal to about 100 µm, such as a thickness of about 1 µm, about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm. The electrode 50 is representative of both positive electrodes (e.g., cathodes in electrochemical cells) and negative electrodes (e.g., anodes in electrochemical cells). Therefore, the electrode active material can be either a positive electrode active material or a negative electrode active material. In certain variations, the electrode active material 54 is an anode active material, such as lithium metal or sodium metal. The electrode 50 does not comprise a mesoporous film in accordance with the current technology.

Figure 3A:
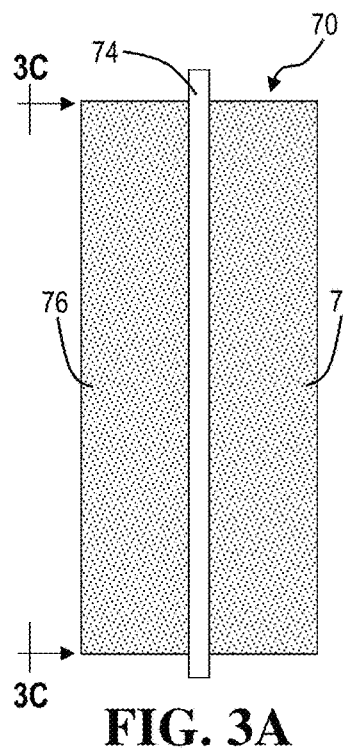
FIG. 3A is an illustration of an electrode having an electrode active material coated with a mesoporous film in accordance with various aspects of the current technology.
Figure 3B:
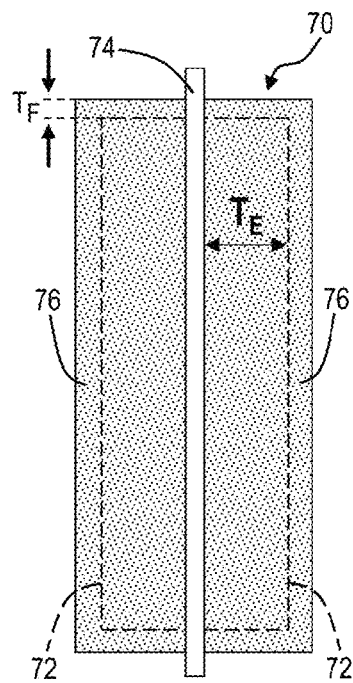
FIG. 3B is an illustration of the electrode of FIG. 3A showing an electrode active material hidden by the mesoporous film.
Figure 3C:
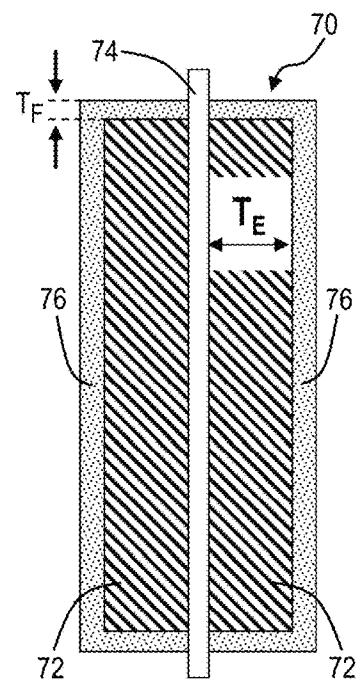
FIG. 3C is a view of the electrode of FIG. 3A after removal of a layer or plane indicated by arrows 3C, which exposes the previously hidden electrode active material.

FIG. 3A shows an exemplary electrode 70, FIG. 3B shows the electrode 70 with a hidden interior portion (an electrode active material) indicated by a dashed line, and FIG. 3C is a view of the electrode 70 in FIG. 3A after removal of a layer or plane indicated by arrows 3C, which exposes the interior portion. The electrode 70 comprises an electrode active material 72 that is disposed on opposing sides of a current collector 74. The electrode active material 72 has a thickness $T_E$, as described above, and can be a cathode active material comprising a transition metal oxide or transition metal polyanion or an anode active material. In certain variations, the electrode active material 72 is an anode active material, such as lithium metal or sodium metal. The electrode 70 also includes a mesoporous film 76 coating on, i.e., disposed on, at least a portion of the electrode active material 72. By "at least a portion of the electrode active material" it is meant that the mesoporous film 76 completely coats the electrode active material 72 on both sides of the current collector 74, the mesoporous film 76 completely coats the electrode active material 72 on only one side of the current collector 74 (and the electrode active material on the other side of the current collector is uncoated), or the mesoporous film 76 at least partially coats the electrode active material 72 on both sides of the current collector 74, such that the mesoporous film 76 can independently be continuous or discontinuous on either side of the current collector 74.

The mesoporous film 76 comprises a ceramic oxide formed from the ceramic oxide particles, the ceramic oxide being $M_2SiO_3$, $MAlO_2$, $M_2O$—$Al_2O_3$—$SiO_2$, or combinations thereof, where M is Li, Na, or a combination thereof (as described above). Accordingly, when employed in an electrochemical cell with a lithium-metal anode, the ceramic oxide comprises $Li_2SiO_3$, $LiAlO_2$, $Li_2O$—$Al_2O_3$—$SiO_2$, or combinations thereof. Alternatively, when employed in an electrochemical cell with a sodium-metal anode, the ceramic oxide comprises $Na_2SiO_3$, $NaAlO_2$, $Na_2O$—$Al_2O_3$—$SiO_2$, or combinations thereof.

The mesoporous film 76 comprises a plurality of mesopores, also referred to herein as "pores," having an average pore size of greater than or equal to about 0.2 nm to less than or equal to about 10 nm, or greater than or equal to about 0.5 nm to less than or equal to about 5 nm, including sizes of about 0.2 nm, about 0.25 nm, about 0.3 nm, about 0.35 nm, about 0.4 nm, about 0.45 nm, about 0.5 nm, about 0.55 nm, about 0.6 nm, about 0.65 nm, about 0.7 nm, about 0.75 nm, about 0.8 nm, about 0.85 nm, about 0.9 nm, about 0.95 nm, about 1 nm, about 1.2 nm, about 2 nm, about 2.5 nm, about 3 nm, about 3.5 nm, about 4 nm, about 4.5 nm, about 5 nm, about 5.5 nm, about 6 nm, about 6.5 nm, about 7 nm, about 7.5 nm, about 8 nm, about 8.5 nm, about 9 nm, about 9.5 nm, or about 10 nm.

The plurality of pores of the mesoporous film 76 results in a porosity (i.e., a fraction of the total volume of pores over the total volume of the mesoporous film 76) of greater than or equal to about 15% to less than or equal to about 50% or higher, such as a porosity of about 15%, about 20%, about 25%, about 30%, about 35%, about 40%, about 45%, or about 50%.

The mesoporous film 76 has a surface area, also referred to as a "high surface area," of greater than or equal to about 20 m$^2$/g to less than or equal to about 1500 m$^2$/g, including surface areas of about 20 m$^2$/g, about 50 m$^2$/g, about 100 m$^2$/g, about 150 m$^2$/g, about 200 m$^2$/g, about 250 m$^2$/g, about 300 m$^2$/g, about 350 m$^2$/g, about 400 m$^2$/g, about 450 m$^2$/g, about 500 m$^2$/g, about 550 m$^2$/g, about 600 m$^2$/g, about 650 m$^2$/g, about 700 m$^2$/g, about 750 m$^2$/g, about 800 m$^2$/g, about 850 m$^2$/g, about 900 m$^2$/g, about 950 m$^2$/g, about 1000 m$^2$/g, about 1100 m$^2$/g, about 1200 m$^2$/g, about 1300 m$^2$/g, about 1400 m$^2$/g, or about 1500 m$^2$/g. It is understood that the surface area of the mesoporous film 76 may vary depending on the binder included in the mesoporous film 76 and respective concentrations of the ceramic oxide and the binder in the mesoporous film 76.

The mesoporous film 76 has a thickness $T_F$ that is greater than or equal to about 1 µm to less than or equal to about 50 µm, greater than or equal to about 2 µm to less than or equal to about 20 µm or greater than or equal to about 5 µm to less than or equal to about 15 µm, such as a thickness of about 1 µm, about 2 µm, about 3 µm, about 4 µm, about 5 µm, about 10 µm, about 15 µm, about 20 µm, about 25 µm, about 30 µm, about 35 µm, about 40 µm, about 45 µm, or about 50 µm. The mesoporous film 76 includes the ceramic oxide at a concentration of greater than or equal to about 70 wt. % to less than or equal to about 95 wt. %, greater than or equal to about 75 wt. % to less than or equal to about 92 wt. %, or greater than or equal to about 80 wt. % to less than or equal to about 90 wt. %, such as at a concentration of about 70 wt. %, about 75 wt. %, about 80 wt. %, about 85 wt. %, about 90 wt. %, about 91 wt. %, about 92 wt. %, about 93 wt. %, about 94 wt. %, or about 95 wt. %.

Figure 4:
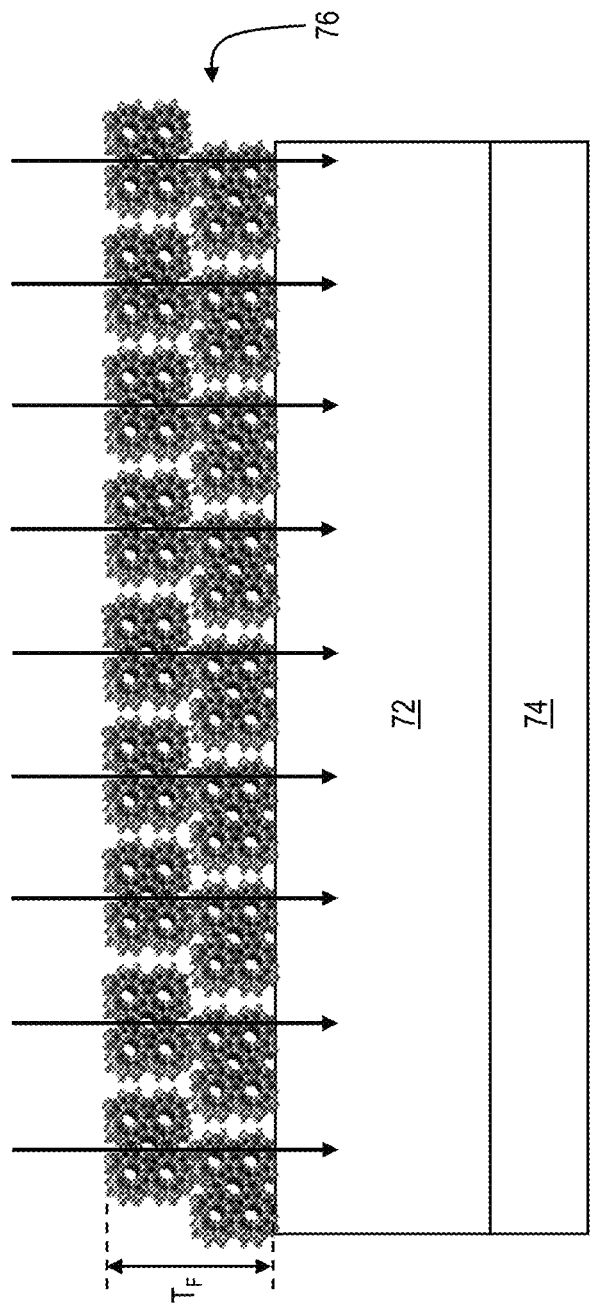
FIG. 4 is a magnified illustration of an exemplary electrode in accordance with various aspects of the current technology.

In some embodiments, the electrode 70 is an anode (i.e., the electrode active material 72 comprises lithium metal or sodium metal), which is located within an electrochemical cell or battery. The mesoporous film 76 suppresses the formation of mossy structures and dendrites at the surface of the electrode 70. Thus the mesoporous film 76 increases the cycle efficiency and lifetime of the electrochemical cell or battery relative to a similar electrode that does not include the mesoporous film 76, such as the electrode 50 of FIG. 2. Moreover, the porosity, pore size, and high surface area are collectively configured to retain liquid electrolyte, when present, at a close proximity (defined by the thickness $T_F$) to the surface of the electrode active material 72, which facilitates ion diffusion and charge transfer at the electrode 70. For example, FIG. 4 shows a magnified region of the electrode 70, including the current collector 74, the electrode active material 72, and the mesoporous film 76 have a thickness of $T_F$. Liquid electrolyte within the mesoporous film 76 are retained within a distance of $T_F$ to the electrode surface, which facilitates ion, e.g., lithium or sodium ions, diffusion to the electrode active material 72 and charge transfer, which results in less impedance relative to the similar electrode that does not include the mesoporous film 76.

In some embodiments, the electrode 70 is an anode located within a electrochemical cell or battery that also includes an electrolyte that is capable of reacting with water to form HF. When HF is formed within the electrolyte, the mesoporous film 76 scavenges and incorporates the hydrogen atom from the HF. The HF is then rendered incapable of reacting with transition metal oxides or transition metal polyanions in the cathode, which results in in the prevention, inhibition, or minimization of transition metal dissolution at the cathode. This scavenging of HF also increases the lifetime of the electrochemical cell or battery.

The current technology also provides a method of fabricating an electrode, such as the electrode 70 shown in FIGS. 3A-3C. In some variations, the entire method is performed under an inert atmosphere, such as in a dry room having a dew point of about −40° C. or a relative humidity of about 0.5% at 72° F. or in a glove box filled with an inert gas, such as helium (He), neon (Ne), argon (Ar), krypton (Kr), or combinations thereof. The method comprises dissolving a binder in a solvent to form a binder solution comprising the binder at a concentration of greater than or equal to about 2 wt. % to less than or equal to about 10 wt. % or greater than or equal to about 4 wt. % to less than or equal to about 8 wt. %, such as at a concentration of about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, or about 10 wt. %. The binder can be nonaqueous or aqueous. Non-limiting examples of nonaqueous binders include polyvinylidene fluoride (PVDF), poly(ethylene oxide) (PEO), poly(tetrafluoroethylene) (PTFE), copolymers of PTFE and perfluoro-3,6-dioxa-4-methyl-7-octene-sulfonic acid (e.g., NAFION® tetrafluoroethylene-perfluoro-3,6-dioxa-4-methyl-7-octenesulfonic acid copolymer), and combinations thereof, which are dissolvable in solvents such as N-methyl-2-pyrrolidone (NMP), tetrahydrofuran (THF), dimethylsulfoxide (DMSO), N,N-dimethylformamide (DMF), methyl ethyl ketone (MEK), N,N-dimethylacetamide (DMAc), acetone, acetonitrile (MeCN), and combinations thereof, as non-limiting examples. Non-limiting examples of aqueous binders include sodium carboxymethyl, styrene-butadiene rubber (SBR), sodium alginate, lithium polyacrylic acid (LiPAA), sodium carboxymethylcellulose (NaCMC), and combinations thereof, which are dissolvable in solvents such as water (including distilled and deionized water), t-butanol, propanol, ethanol, methanol, ammonia, acetic acid, and combinations thereof, as non-limiting examples.

The method also comprises mixing a powder including ceramic oxide particles comprising the $M_2SiO_3$, $MAlO_2$, $M_2O-Al_2O_3-SiO_2$, or combinations thereof into the binder solution comprising the binder dissolved in the solvent to form a slurry having a viscosity of greater than or equal to about 1 cps to less than or equal to about 10,000 cps or greater than or equal to about 1000 cps to less than or equal to about 8000 cps, including viscosities of about 1 cps, about 500 cps, about 1000 cps, about 1500 cps, about 2000 cps, about 2500 cps, about 3000 cps, about 3500 cps, about 4000 cps, about 4500 cps, about 5000 cps, about 5500 cps, about 6000 cps, about 6500 cps, about 7000 cps, about 7500 cps, about 8000 cps, about 8500 cps, about 9000 cps, about 9500 cps, or about 10,000 cps. The concentration of the ceramic oxide in the slurry is greater than or equal to about 20 wt. % to less than or equal to about 70 wt. %, including concentrations of about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, or about 70 wt. %. The amount of the ceramic oxide can be adjusted so a suitable viscosity is achieved. The remainder of the slurry is binder solution, which has a concentration of greater than or equal to about 30 wt. % to less than or equal to about 80 wt. %.

Next, the method comprises casting a continuous or discontinuous layer having a thickness of $T_F$ (as described above) of the slurry onto a surface of an electrode active material, such as lithium metal or sodium metal. In some variations, at least the casting is performed in the inert atmosphere as described above. The casting can be performed using any method known in the art, such as by doctor blading, spin casting, or pipetting, as non-limiting examples. In certain variations, the casting is performed by spin coating, which comprises applying the slurry to the electrode surface and spinning the electrode at a speed of greater than or equal to about 500 rpm to less than or equal to about 3000 rpm or greater than or equal to about 1000 rpm to less than or equal to about 2500 rpm for a time of greater than or equal to about 15 seconds to less than or equal to about 60 seconds. The spinning is repeated until a desired slurry thickness is achieved, such as a thickness of $T_F$ or thicker than $T_F$. The spin coating then optionally comprises spinning the electrode a final time at a speed of greater than or equal to about 2500 rpm to less than or equal to about 3000 rpm for a time of greater than or equal to about 1 second to less than or equal to about 20 seconds until an excess amount of the slurry is removed from the electrode surface.

The method then comprises removing the solvent from the slurry to generate the microporous film on the electrode. The removing is performed by at least one of incubating in an oven at a temperature of greater than or equal to about 30° C. to less than or equal to about 80° C. or greater than or equal to about 60° C. to less than or equal to about 75° C. (such as a temperature of about 30° C., about 35° C., about 40° C., about 45° C., about 50° C., about 55° C., about 60° C., about 65° C., about 70° C., about 75° C., or about 80° C.) or applying a negative pressure, i.e., a vacuum. The removing is performed for greater than or equal to about 1 hour to less than or equal to about 24 hours, such as for a time of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours. The resulting electrode has the microporous film with a first porosity. The first porosity can be the above-described porosity that is greater than or equal to about 15% to less than or equal to about 50% or the first porosity can be greater than about 50%. Therefore, in some variations, the mesoporous film has at least one of the above-described thickness $T_F$, porosity, pore size, or surface area after the removing of the solvent.

In some embodiments, especially when the first porosity is greater than about 50%, the method also includes calendaring the electrode between a flat surface and a roller or between two rollers to generate a desired second porosity in the coating. The second porosity is lower than the first porosity and is greater than or equal to about 15% to less than or equal to about 50%. The calendaring applies a continuous pressure of greater than or equal to about 1 Pa to less than or equal to about 10 MPa to the electrode. Therefore, the mesoporous film has the above-described thickness $T_F$, porosity, pore size, and surface area after the calendaring.

Accordingly, the current technology provides electrodes comprising an electrode active material and a mesoporous film coating at least a portion of the electrode active material. The mesoporous film comprises a ceramic oxide comprising $M_2SiO_3$, $MAlO_2$, $M_2O$—$Al_2O_3$—$SiO_2$, or combinations thereof, where M is lithium, sodium, or a combination thereof. In certain variations, the electrode is an anode and the electrode active material comprises lithium metal or sodium metal. Methods for fabricating these electrodes are also provided above. The current technology also provides electrochemical cells that cycle lithium ions or sodium ions and batteries that include the electrode as an anode, a cathode, and a liquid electrolyte that is capable of reacting with water to form HF, wherein the mesoporous film of the anode scavenges H atoms from the HF and facilities ion diffusion to the anode. As a non-limiting example, the electrochemical cells and batteries can include a cathode, an anode comprising the mesoporous film, and a solid electrode disposed between the cathode and the anode.

Embodiments of the present technology are further illustrated through the following non-limiting example.

EXAMPLE

An anode comprising a lithium-metal active material coated with a mesoporous film comprising a ceramic oxide is fabricated according to the methods of the current technology. This entire procedure is performed in a glove box. More particularly, a binder solution comprising 6 wt. % polyvinylidene fluoride (PVDF) in N-methyl-2-pyrrolidone (NMP) is prepared. $Li_2SiO_3$ is added to the binder solution and dispersed with a planetary mixer (THINKY, Laguna Hills, Calif.) for about 5 minutes to form a slurry comprising 80-95 $Li_2SiO_3$ wt. % and 5-20 wt. % binder solution and having a viscosity of 5000-6000 cps. 0.5 mL of the slurry is applied to a surface of the lithium-metal anode, and the electrode is spun at about 2000 rpm for about 30 seconds. The spinning is repeated as many times as needed until a predetermined thickness is achieved, the predetermined thickness in this example being about 1-10 μm. A final spin at about 3000 rpm for about 10 seconds is performed to remove extra slurry from the anode surface. The NMP is removed in a vacuum oven at about 70° C. for about 12 hours. A control lithium-metal anode does not have the mesoporous film.

Figure 5A:
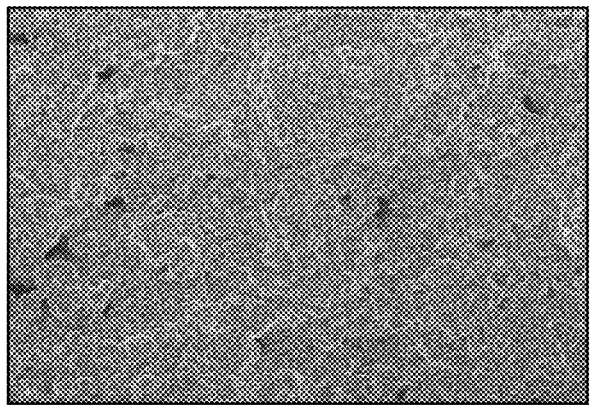
FIG. 5A is a micrograph of a mesoporous film prepared in accordance with various aspects of the current technology prior to cycling.
Figure 5B:
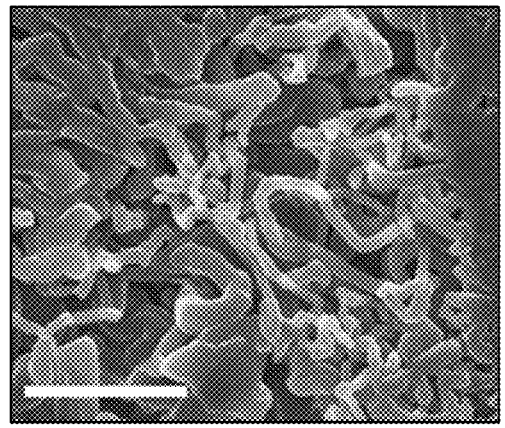
FIG. 5B is a micrograph of an uncoated electrode after about five cycles.
Figure 5C:
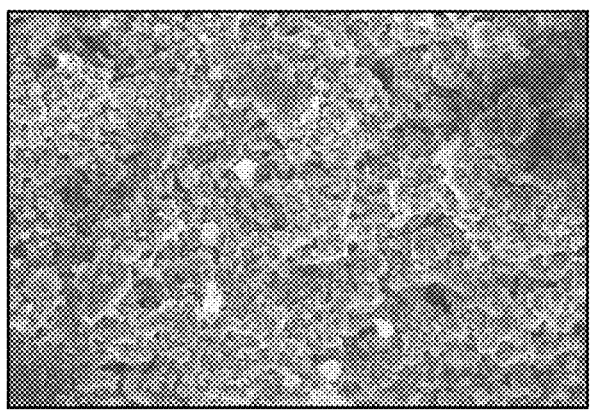
FIG. 5C is a micrograph of a mesoporous film prepared in accordance with various aspects of the current technology after about fifty cycles.

The anode and control anode are separately paired with a cathode comprising NMC 622 (4.2 mAh/cm$^2$) and 20 μL $LiPF_6$ in FEC-EMC (1:4 vol. ratio). FIG. 5A shows a micrograph of the mesoporous film prior to cycling. FIG. 5B shows the control anode that does not include the mesoporous film after about five cycles. The scale bar is 5 μm. As can be seen here, a mossy surface is already formed on the original anode surface after the about five cycles. FIG. 5C shows the mesoporous film after about fifty cycles. Here, the mesoporous film has a similar morphology as it did prior to cycling (FIG. 5A). The film coated on the anode maintains its microstructure integrity after cycling and no obvious cracks are identifiable. The micrographs of FIGS. 5A-5C show that the mesoporous film increases the lifetime of the anode relative to an anode that does not have the mesoporous film.

Figure 6:
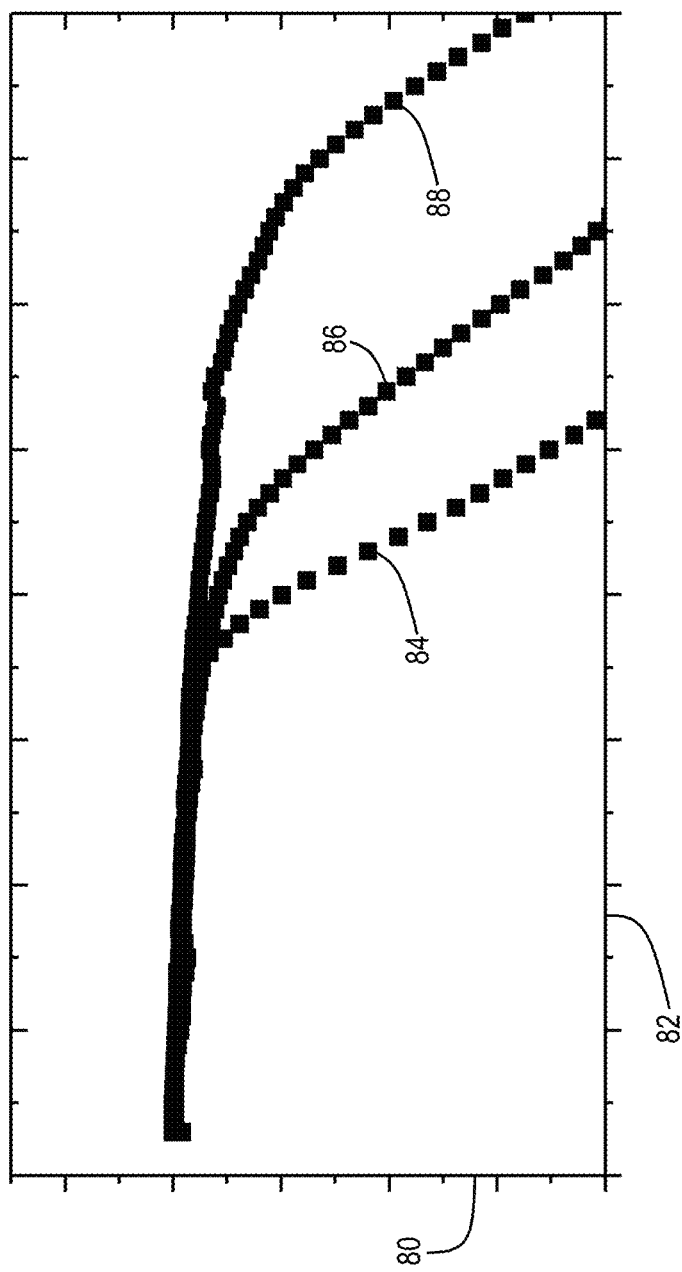
FIG. 6 is a graph showing capacity retention versus cycle number for two control anodes and an anode prepared in accordance with various aspects of the current technology.

A second control having an $Al_2O_3$ coating is prepared. The anode with the mesoporous film, the control anode, and the second control anode are separately paired with a cathode comprising NMC 622 (4.2 mAh/cm$^2$), and 20 μL $LiPF_6$ in FEC-EMC (1:4 vol. ratio) and subjected to C/3 charge discharge. The results are shown in FIG. 6, which is a graph having a y-axis 80 representing capacity retention (from 20% to 130%) and an x-axis 82 representing cycle number (from 0 cycles to 80 cycles). A first curve 84 is provided from the control anode (no coating), a second curve 86 is provided from the second control anode ($Al_2O_3$ coating), and a third curve 88 is provided by the anode having the mesoporous coating according to the current technology. This graph shows that the $Li_2SiO_3$ mesoporous film improves the cycle stability, working more effectively than an $Al_2O_3$ coating, mainly due to electrolyte retention by mesopores in the $Li_2SiO_3$ and a better lithium ion transfer route to the anode. In addition, the $Li_2SiO_3$/$LiAlO_2$ coating materials provide better ionic conductivity compared to the $Al_2O_3$ coating, which better maintains the ion transfer route, considering the potential decay of film coatings during cycling.

Figure 7A:
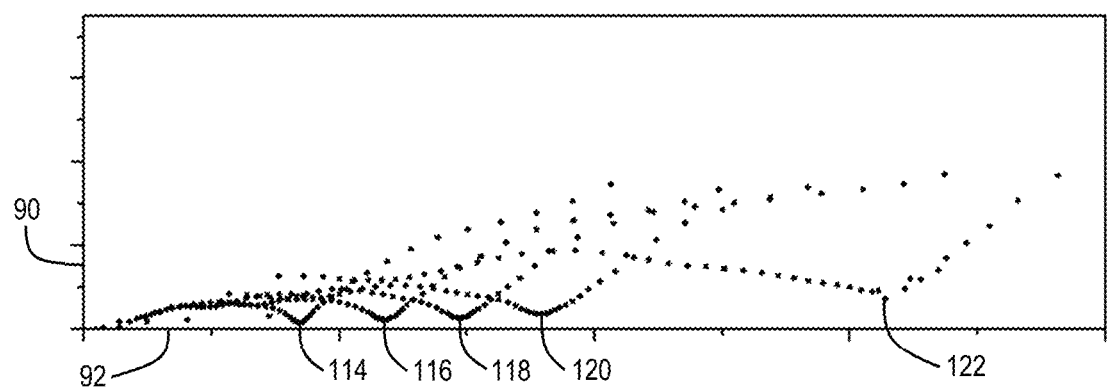
FIG. 7A is a graph showing impedance of an uncoated control electrode over forty cycles.
Figure 7B:
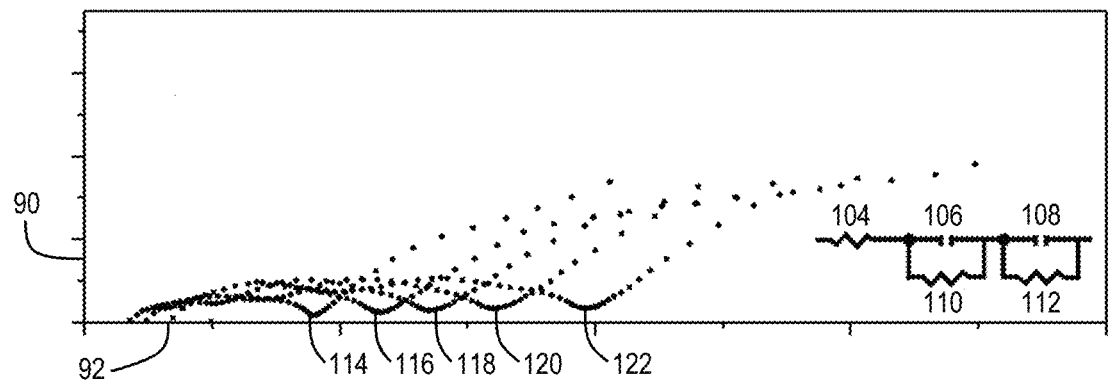
FIG. 7B is a graph showing impedance of an anode prepared in accordance with various aspects of the current technology over forty cycles.
Figure 7C:
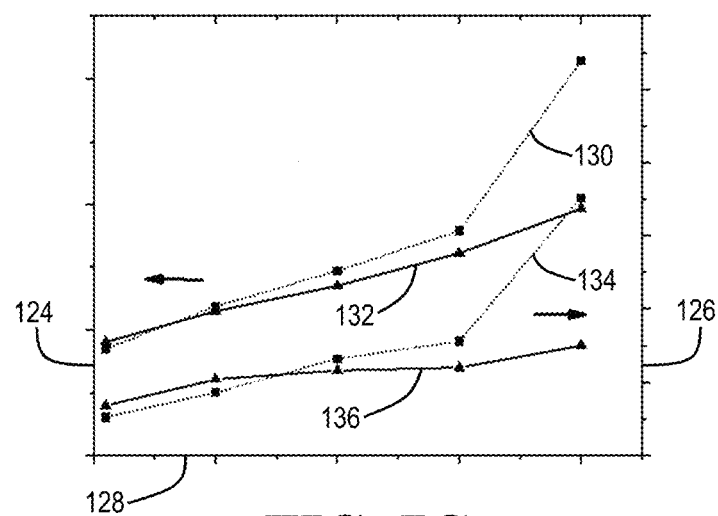
FIG. 7C is a graph showing real and imaginary parts of impedance versus cycle number for the uncoated control electrode of FIG. 7A and the anode prepared in accordance with various aspects of the current technology of FIG. 7B.

Impedance measurements are obtained after cycling the uncoated control anode and the anode having the mesoporous film. The results are shown in FIGS. 7A-7C. FIGS. 7A and 7B, provided by the uncoated control and the mesoporous film-coated anode, respectively, both have a y-axis 90 representing an imaginary part of impedance part (–Im (Z)) from 0Ω to 14Ω and an x-axis 92 representing a real part of impedance (Re(Z)) from 0Ω to 40Ω. The inset in FIG. 7B shows a circuit with Rb 104, a Csei 106, a Cct 108, a Rsei 110, and a Rct 112. In FIGS. 7A and 7B, curves are shown for a first cycle 114, a tenth cycle 116, a twentieth cycle 118, a thirtieth cycle, 120, and a fortieth cycle 122. The data of FIGS. 7A and 7B are collectively presented in FIG. 7C, which is a graph having a first y-axis 124 representing Re(Z) from 0Ω to 35Ω, a second y-axis 126 representing –Im(Z) from 0Ω to 3Ω, and an x-axis 128 representing cycle number from 0 cycles to 45 cycles. A first curve 130 shows Re(Z) for the control anode, a second curve 132 shows Re(Z) for the anode coated with the mesoporous film, a third curve 134 shows –Im(Z) for the control anode, and a fourth curve 136 shows –Im(Z) for the anode coated with the mesoporous film. These data show that although the impedance is initially slightly higher for the anode having the mesoporous film, the anode with the mesoporous film has a much lower increment rate in impedance with increasing cycle number. This relative decrease in impedance is attributed to a suppression of mossy formations and/or dendrites forming from the lithium-metal electrodes.

Figure 8:
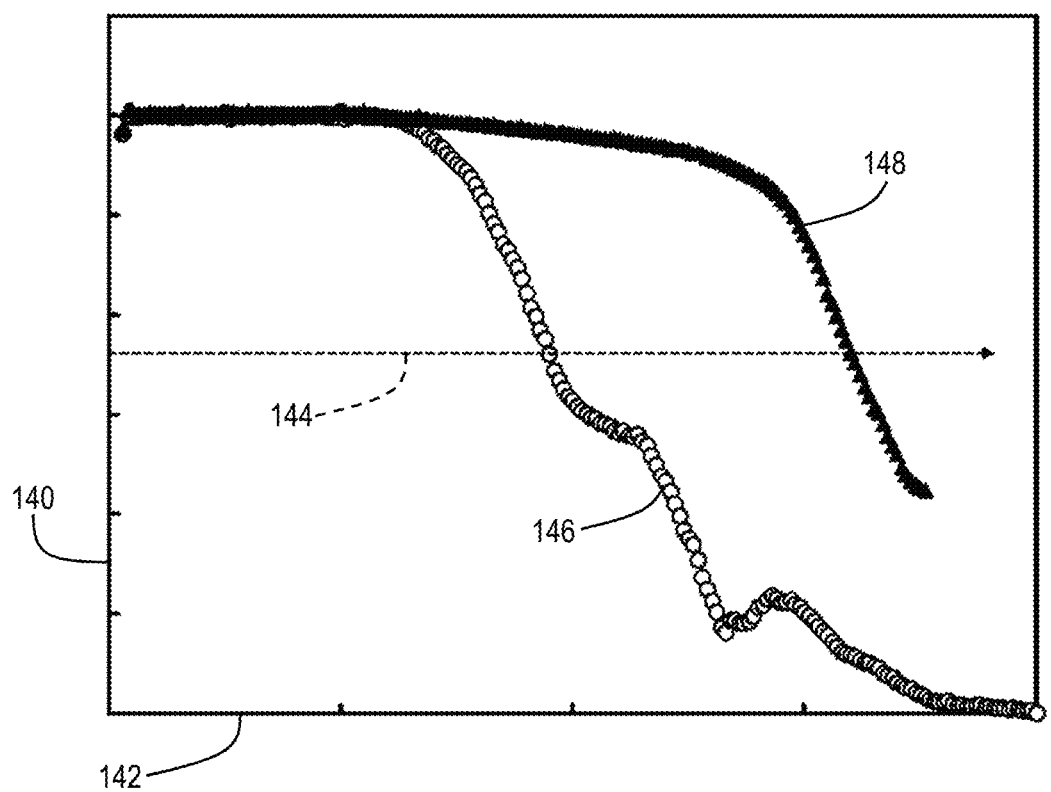
FIG. 8 is a graph showing discharge capacity versus cycle number for an uncoated control anode and an anode prepared in accordance with various aspects of the current technology.

The anode with the mesoporous film and the uncoated control anode are separately paired with a cathode comprising NMC 622 (4.2 mAh/cm$^2$) and 20 μL $LiPF_6$ in FEC-EMC (1:4 vol. ratio) and subjected to C/10 charge and C/5 discharge. The results are shown in FIG. 8, which shows a graph having a y-axis 140 representing discharge capacity from 0 Ah to 0.007 Ah and an x-axis 142 representing cycle number from 0 cycles to 200 cycles. A dotted line 144 represents a 60% capacity retention ratio. A first curve 146 shows the uncoated control anode and a second curve 148 shows the anode having the mesoporous film. This low rate test shows even better cycle stability for the anode having the mesoporous film relative to the uncoated control anode.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode comprising:
    a negative electrode active material comprising lithium (Li) metal or sodium (Na) metal; and
    a mesoporous film coating at least a portion of the negative electrode active material, the mesoporous film comprising a plurality of pores, wherein the plurality of pores has an average pore size of greater than 0.5 nm to less than or equal to about 10 nm;
    wherein the mesoporous film comprises particles selected from selected from $M_2SiO_3$, $MAlO_2$, $M_2O$—$Al_2O_3$—$SiO_2$, or combinations thereof, where M is lithium (Li), sodium (Na), or a combination thereof, wherein the particles have a surface area of greater than or equal to about 80 m$^2$/g to less than or equal to about 500 m$^2$/g, and a porosity of greater than or equal to about 5% to less than or equal to about 50%.

2. The electrode according to claim 1, wherein the mesoporous film comprises $Li_2SiO_3$, $LiAlO_2$, $Li_2O$—$Al_2O_3$—$SiO_2$, or combinations thereof.

3. The electrode according to claim 1, wherein the mesoporous film comprises $Na_2SiO_3$, $NaAlO_2$, $Na_2O$—$Al_2O_3$—$SiO_2$, or combinations thereof.

4. The electrode according to claim 1, wherein the plurality of pores has an average pore size of greater than or equal to about 0.55 nm to less than or equal to about 10 nm.

5. The electrode according to claim 1, wherein the mesoporous film has a porosity of greater than or equal to about 15% to less than or equal to about 50%.

6. The electrode according to claim 1, wherein the mesoporous film has a surface area of greater than or equal to about 20 m$^2$/g to less than or equal to about 1500 m$^2$/g.

7. The electrode according to claim 1, wherein the mesoporous film is disposed on the electrode active material as a continuous film that coats at least a portion of the electrode active material.

8. The electrode according to claim 1, wherein the mesoporous film has a thickness of greater than or equal to about 1 µm to less than or equal to about 50 µm.

9. The electrode according to claim 1, wherein the electrode is disposed in a battery that cycles lithium (Li) or sodium (Na) ions.

10. The electrode according to claim 1, wherein the mesoporous film has a thickness of greater than 5 micrometers to less than or equal to about 50 micrometers.

11. An electrode comprising:
    an anode active material comprising lithium (Li) or sodium (Na); and
    a mesoporous film comprising particles selected from $M_2SiO_3$, $MAlO_2$, $M_2O$—$Al_2O_3$—$SiO_2$, or combinations thereof, where M is lithium (Li), sodium (Na), or a combination thereof, wherein the particles have a surface area of greater than or equal to about 80 m$^2$/g to less than or equal to about 500 m$^2$/g, and a porosity of greater than or equal to about 5% to less than or equal to about 50% and the mesoporous film coating at least a portion of the anode active material,
    wherein the mesoporous film comprises a plurality of pores having an average pore size of greater than or equal to about 0.5 nm to less than or equal to about 10 nm, a porosity of greater than or equal to about 15% to less than or equal to about 50%, and a surface area of greater than or equal to about 20 m$^2$/g to less than or equal to about 1500 m$^2$/g, wherein the plurality of pores in the mesoporous film are configured to retain liquid electrolyte adjacent to a surface of the anode active material.

12. The electrode according to claim 11, wherein the anode active material comprises lithium (Li) metal and the mesoporous film comprises $Li_2SiO_3$, $LiAlO_2$, $Li_2O$—$Al_2O_3$—$SiO_2$, or combinations thereof.

13. The electrode according to claim 11, wherein the anode active material comprises sodium (Na) metal and the mesoporous film comprises $Na_2SiO_3$, $NaAlO_2$, $Na_2O$—$Al_2O_3$—$SiO_2$, or combinations thereof.

14. The electrode according to claim 11, wherein the electrode is an anode positioned within an electrochemical cell.

15. A battery that conducts lithium (Li) ions or sodium (Na) ions, the battery comprising:
    the eletrode according to claim 11 as an anode;
    a cathode; and
    a liquid or solid electrolyte disposed between the anode and the cathode.

16. A method of fabricating an electrode, the method comprising:
    mixing a powder into a binder solution comprising a binder dissolved in a solvent to form a slurry having a viscosity of greater than or equal to about 1 cps to less than or equal to about 10,000 cps, wherein the mesoporous film comprises particles selected from $M_2SiO_3$, $MAlO_2$, $M_2O$—$Al_2O_3$—$SiO_2$, or combinations thereof, where M is lithium (Li), sodium (Na), or a combination thereof, wherein the particles have a particle porosity of greater than or equal to about 5% to less than or equal to about 50% and a particle surface area of greater than or equal to about 80 m$^2$/g to less than or equal to about 500 m$^2$/g;
    under an inert atmosphere, casting a layer of the slurry onto a surface of an anode comprising lithium (Li) metal or sodium (Na) metal; and
    removing the solvent from the slurry to form a mesoporous film on the anode, wherein the mesoporous film has a first porosity with a plurality of pores having an average pore size of greater than 0.5 nm to less than or equal to about 10 nm.

17. The method according to claim 16, wherein the casting is performed by spin casting.

18. The method according to claim 16, wherein the layer of the slurry has a thickness of greater than or equal to about 1 µm to less than or equal to about 50 µm.

19. The method according to claim 16, wherein the slurry comprises the powder at a concentration of greater than or equal to about 20 wt. % to less than or equal to about 70 wt. %.

20. The method according to claim 16, further comprising:
    calendaring the anode comprising the mesoporous film having the first porosity to generate a second porosity in the mesoporous film, the second porosity being lower than the first porosity.

* * * * *